United States Patent
Friedman et al.

(10) Patent No.: US 12,287,970 B2
(45) Date of Patent: Apr. 29, 2025

(54) METHODS AND SYSTEMS FOR LIMITING DATA TRAFFIC WHILE PROCESSING COMPUTER SYSTEM OPERATIONS

(71) Applicant: Mellanox Technologies, Ltd., Yokneam (IL)

(72) Inventors: Yamin Friedman, Haifa (IL); Idan Burstein, Akko (IL); Hillel Chapman, Ramat Hashofet (IL); Gal Yefet, Haifa (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 18/422,162

(22) Filed: Jan. 25, 2024

(65) Prior Publication Data
US 2024/0168645 A1 May 23, 2024

Related U.S. Application Data

(63) Continuation of application No. 17/658,679, filed on Apr. 11, 2022, now Pat. No. 11,914,865.

(51) Int. Cl.
*G06F 3/06* (2006.01)
*G06F 12/06* (2006.01)
*G06F 12/0897* (2016.01)

(52) U.S. Cl.
CPC .......... *G06F 3/0613* (2013.01); *G06F 3/0652* (2013.01); *G06F 3/0659* (2013.01);
(Continued)

(58) Field of Classification Search
CPC ........ G06F 3/06; G06F 3/0613; G06F 3/0652; G06F 3/0659; G06F 3/0673; G06F 12/06; G06F 12/0897; G06F 12/08
(Continued)

(56) References Cited

U.S. PATENT DOCUMENTS

| | | | |
|---|---|---|---|
| 11,500,591 B1 * | 11/2022 | Makam | G06F 3/0619 |
| 11,609,859 B2 | 3/2023 | Kumar et al. | |

(Continued)

FOREIGN PATENT DOCUMENTS

| | | | | |
|---|---|---|---|---|
| EP | 3055769 B1 | | 8/2016 | |
| GB | 2508717 A | * | 6/2014 | G06F 11/073 |
| WO | WO-2012134641 A2 | * | 10/2014 | G06F 12/1081 |

OTHER PUBLICATIONS

H. Zhang, G. Chen, B. C. Ooi, K.-L. Tan and M. Zhang, "In-Memory Big Data Management and Processing: A Survey," in IEEE Transactions on Knowledge and Data Engineering, vol. 27, No. 7, pp. 1920-1948, Jul. 1, 2015.*

(Continued)

*Primary Examiner* — Pierre Michel Bataille
(74) *Attorney, Agent, or Firm* — Michael M. McCraw; Moore & Van Allen PLLC

(57) ABSTRACT

A method and system are provided for limiting unnecessary data traffic on the data busses connecting the various levels of system memory. Some embodiments may include processing an invalidation command associated with a system or network operation requiring temporary storage of data in a local memory area. The invalidation command may comprise a memory location indicator capable of identifying the physical addresses of the associated data in the local memory area. Some embodiments may preclude the data associated with the system or network operation from being written to a main memory by invalidating the memory locations holding the temporary data once the system or network operation has finished utilizing the local memory area.

20 Claims, 7 Drawing Sheets

(52) U.S. Cl.
CPC ............ *G06F 3/0673* (2013.01); *G06F 12/06* (2013.01); *G06F 12/0897* (2013.01)

(58) Field of Classification Search
USPC .................................................. 711/170, 171
See application file for complete search history.

(56) References Cited

U.S. PATENT DOCUMENTS

| | | | |
|---|---|---|---|
| 2011/0296133 A1* | 12/2011 | Flynn | .................... G06F 3/0652 |
| | | | 711/171 |
| 2013/0262816 A1 | 10/2013 | Ronen et al. | |
| 2016/0196210 A1 | 7/2016 | Noguchi et al. | |
| 2017/0185519 A1 | 6/2017 | Marshall et al. | |
| 2018/0253890 A1* | 9/2018 | Cook | .................... G06T 15/005 |
| 2021/0209031 A1* | 7/2021 | Truelove | ............. G06F 12/1027 |
| 2022/0092002 A1 | 3/2022 | Yasufuku | |
| 2022/0417206 A1 | 12/2022 | Christidis | |
| 2023/0033584 A1 | 2/2023 | Makam et al. | |
| 2023/0206384 A1* | 6/2023 | Sharma | ............... G06F 12/0842 |
| | | | 345/522 |
| 2023/0206559 A1* | 6/2023 | Brennan | ................. G06T 17/10 |
| | | | 345/418 |
| 2023/0315633 A1* | 10/2023 | ElSharif | .............. G06F 12/0811 |
| | | | 711/122 |

OTHER PUBLICATIONS

B. Jacob and T. Mudge, "Uniprocessor virtual memory without TLBs," in IEEE Transactions on Computers, vol. 50, No. 5, pp. 482-499, May 2001.

* cited by examiner

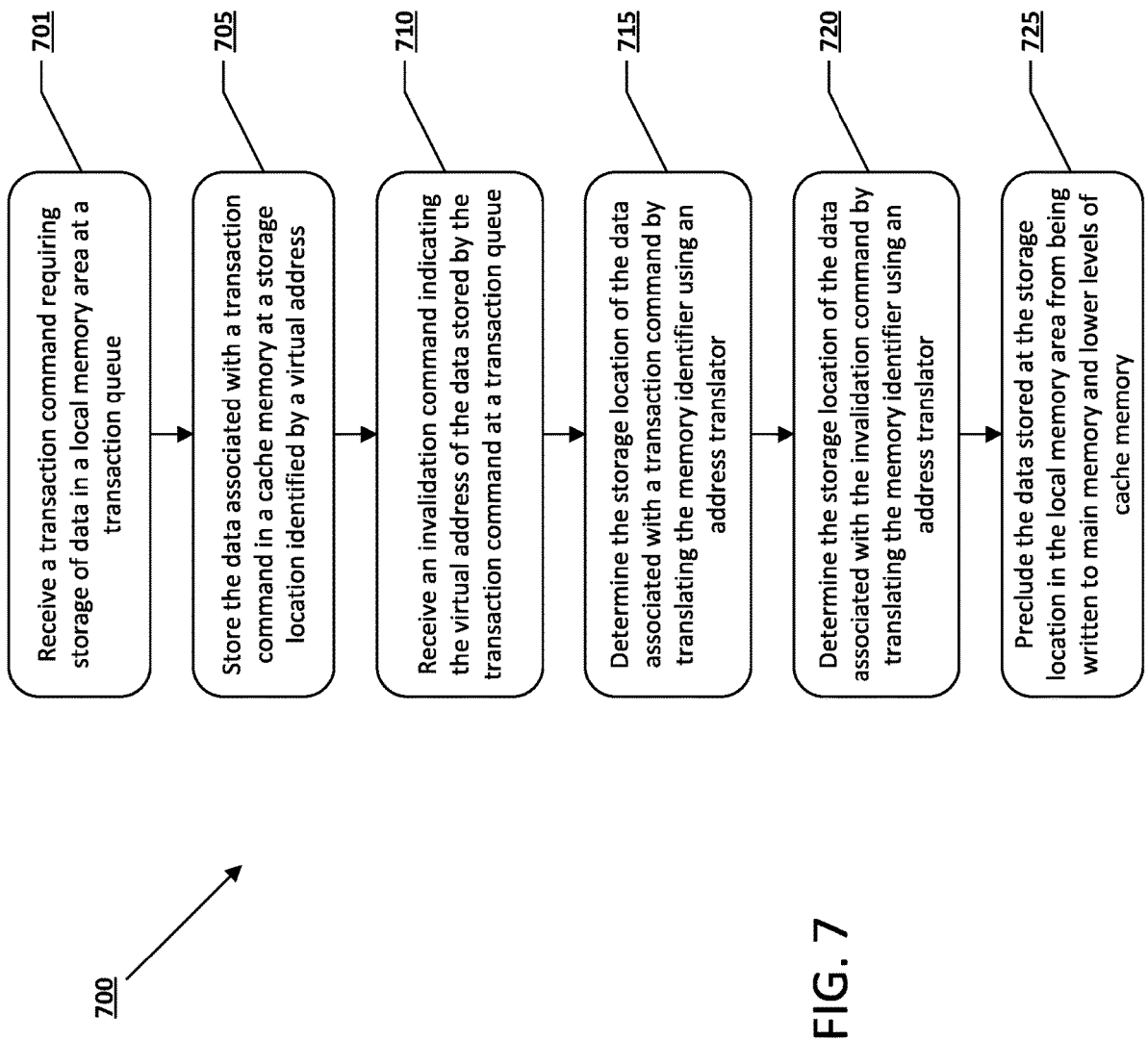

METHODS AND SYSTEMS FOR LIMITING DATA TRAFFIC WHILE PROCESSING COMPUTER SYSTEM OPERATIONS

CROSS-REFERENCE TO RELATED APPLICATIONS

This application is a continuation of U.S. application Ser. No. 17/658,679, filed Apr. 11, 2022, the content of which application is hereby incorporated by reference herein in its entirety.

TECHNOLOGICAL FIELD

Embodiments of the present disclosure relate generally to methods and systems for limiting unnecessary data traffic between the various levels of system memory while performing system operations.

BACKGROUND

Computer systems utilizing data storage are typically designed to provide faster memory products in a locale readily accessible by the computer systems' processes. However, as these blocks of memory increase in size, the time it takes to access data stored in the memory block becomes longer. In addition, faster memory is generally developed with premium technologies, which dramatically increases the cost of these memories as the size becomes larger. For these reasons, computer systems are generally designed with multiple blocks of memory arranged in a hierarchical structure. In these memory hierarchies, the faster and more expensive memory is designed in smaller blocks that can be accessed quickly by the computer systems' processes (e.g., cache memory) while the slower and cheaper memory is provided in large memory blocks in less accessible locales (e.g., main memory).

As a result of this memory hierarchy, computer systems are constantly transferring data between the various levels of the memory hierarchy in an effort to keep the most relevant data in the cache memory while simultaneously keeping the main memory updated. In general, when data is read from a location in main memory, the computer system reads adjoining blocks of data into the cache memory in an attempt to make data the computer system is predicting is likely to be read next more readily accessible. In addition, when data is written to the cache, the computer system must write the data back to the main memory to maintain memory coherence.

In certain systems, excessive traffic on the system bus connecting the various levels of memory may create a major bottleneck and may prove to be prohibitive to improvements in system performance. Applicant has identified a number of deficiencies associated with the present methods and systems for managing the traffic between the cache memory and the lower levels of memory in a memory hierarchy system. Through applied effort, ingenuity, and innovation, many of these identified problems have been solved by developing solutions that are included in embodiments of the present disclosure, many examples of which are described in detail herein.

BRIEF SUMMARY

Methods and systems for preventing temporary data from over utilizing the memory bandwidth of a computer system are provided. An example method performed in a system comprising a local memory area, may include receiving, by a transaction queue, an invalidation command containing a memory location indicator. The invalidation command instructs the invalidation of data stored at physical addresses in the local memory area corresponding to the memory location indicator. Invalidating the data stored at physical addresses in the local memory area in response to the invalidation command may preclude the data stored at the physical addresses from being written to a main memory.

In some embodiments, the method may include a central processor may receive the transaction operation requiring storage of data in the local memory area. The central processor may store the data associated with the transaction operation in the local memory area at the physical addresses. The central processor may then send the transaction operation to the transaction queue, after which the central processor may send the invalidation command to the transaction queue.

In some embodiments, the memory location indicator may identify a virtual address.

In some embodiments, the physical addresses may be determined by translating the memory location indicator using an address translator.

In some embodiments, a command processor may be configured to process transactions in the transaction queue. Further, the command processor, in response to the invalidation command, may be configured to preclude the data stored at the physical addresses from being written to the main memory.

In some embodiments, the command processor may be integrated into a network interface card.

In some embodiments, the command processor may be implemented in an application-specific integrated circuit.

In some embodiments, the local memory area may be a first cache memory, and the method may be configured to preclude the data stored at the physical addresses from being written to a lower level cache memory, for example, a second cache memory.

In some embodiments, the local memory area may be a first cache memory, and the method may invalidate multiple layers of cache.

In some embodiments, the transaction queue may be configured to receive network transaction operations requiring storage of data in the local memory area.

In some embodiments, the local memory area may include a cache memory and the data stored at the physical addresses may be precluded from being written to the main memory by invalidating cache lines associated with physical addresses.

An example system for precluding data stored at a physical address from being written to main memory in response to an invalidation command is further included. The system may include a local memory area configured to store data and a transaction queue configured to receive an invalidation command. The invalidation command may instruct the invalidation of data stored at physical addresses in the local memory area corresponding to a memory location indicator. Invalidating the data in response to the invalidation command may preclude the data from being written to main memory.

In some embodiments, the system may include a central processor configured to receive transaction operations requiring storage of data in the local memory area. The central processor may store the data associated with the transaction operations in the local memory area at the physical addresses. Additionally, the central processor may send the transaction operation and the invalidation command to the transaction queue.

In some embodiments, the memory location indicator may identify a virtual address.

In some embodiments, the system may further include an address translator configured to determine the physical addresses by translating the memory location indicator.

In some embodiments, the system may include a command processor configured to process transactions in the transaction queue. The command processor may be further configured to preclude the data stored at the physical addresses from being written to the main memory in response to an invalidation command.

In some embodiments, the command processor may be integrated into a network interface card.

In some embodiments, the command processor may be implemented in an application-specific integrated circuit.

In some embodiments, the local memory area may be a first cache memory, and the system further include at least one additional cache memory. In these embodiments, the invalidation command may instruct the invalidation of all levels of cache memory.

In some embodiments, the transaction queue may be configured to receive network transaction operations requiring storage of data in the local memory area.

In some embodiments, the local memory area may comprise a cache memory and the data stored at the physical addresses may be precluded from being written to the main memory by invalidated cache lines associated with the physical addresses.

BRIEF DESCRIPTION OF THE DRAWINGS

Having thus described certain example embodiments of the present disclosure in general terms, reference will now be made to the accompanying drawings. The components illustrated in the figures may or may not be present in certain embodiments described herein. Some embodiments may include fewer (or more) components than those showing in the figures.

Figure 1:
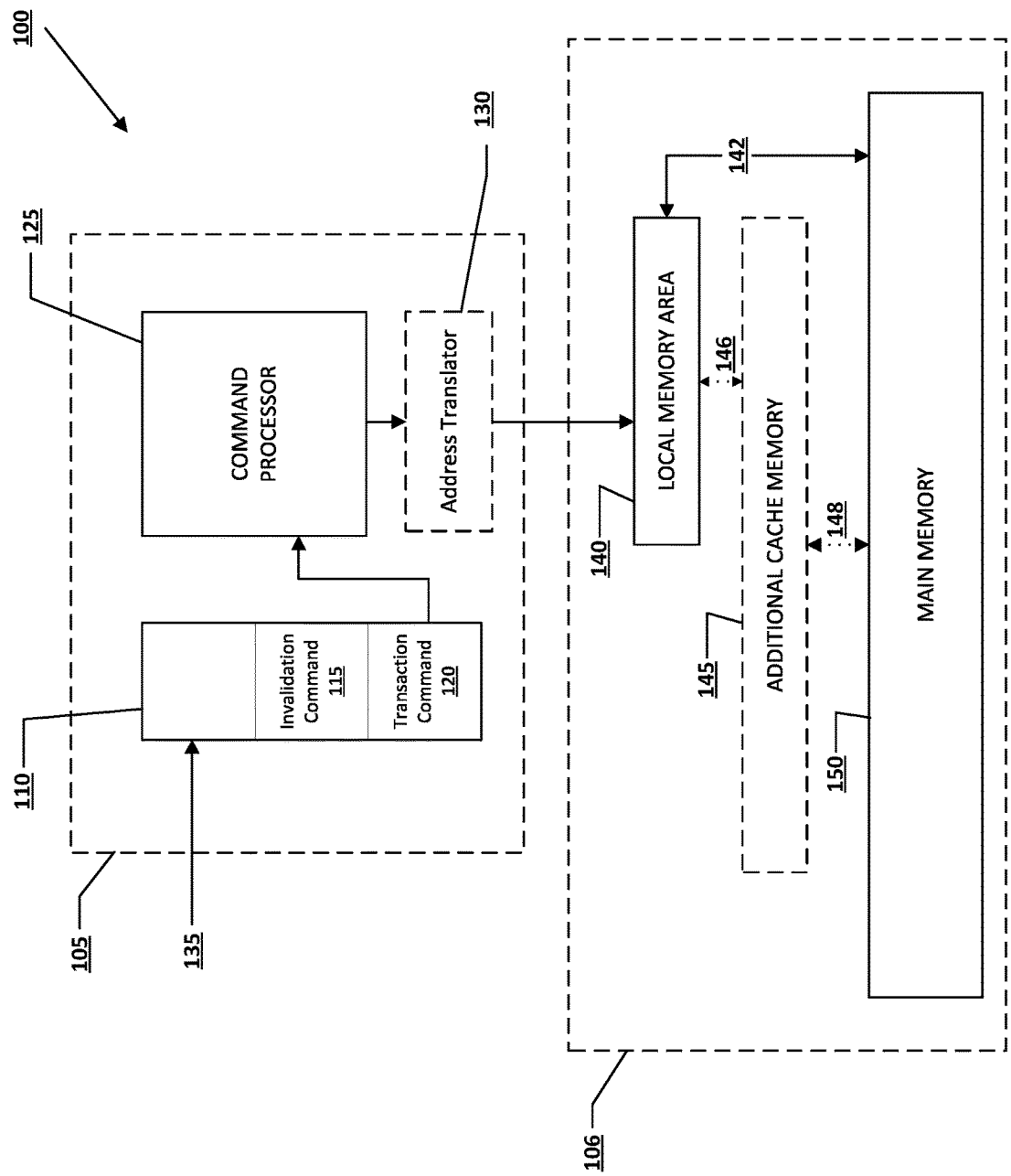
Figure 2:
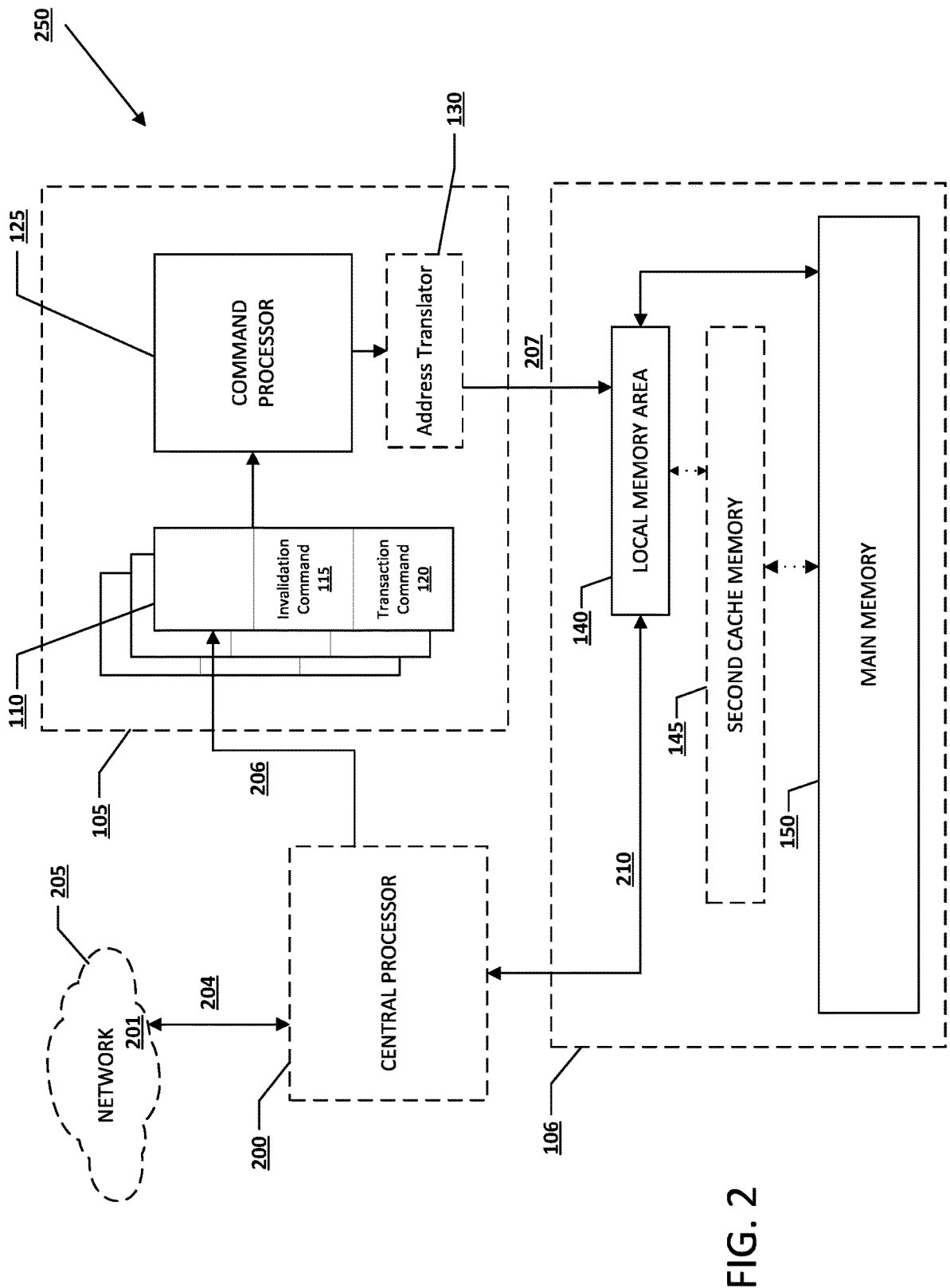
Figure 3:
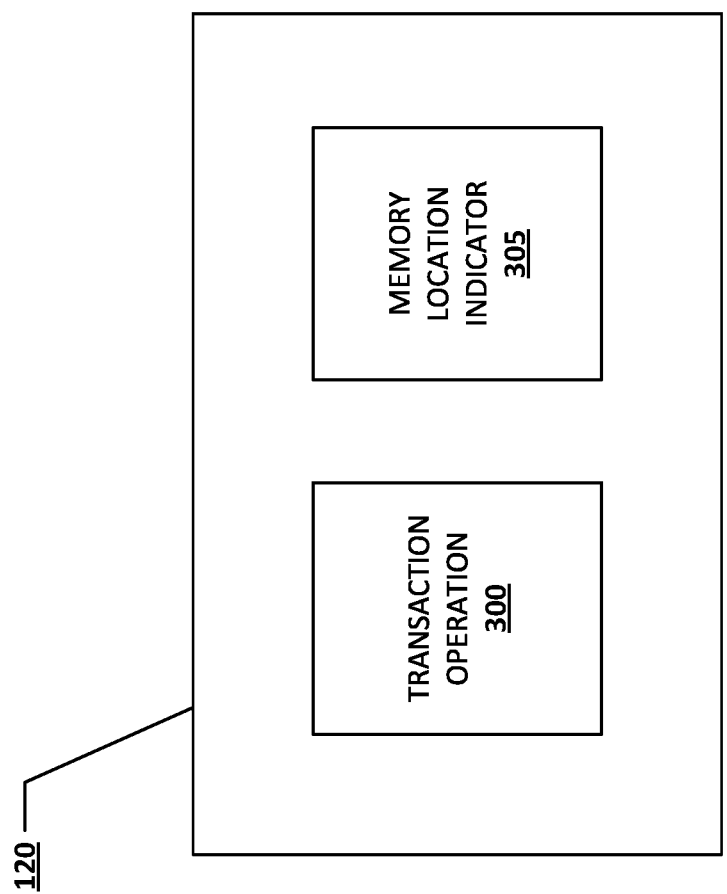
Figure 4:
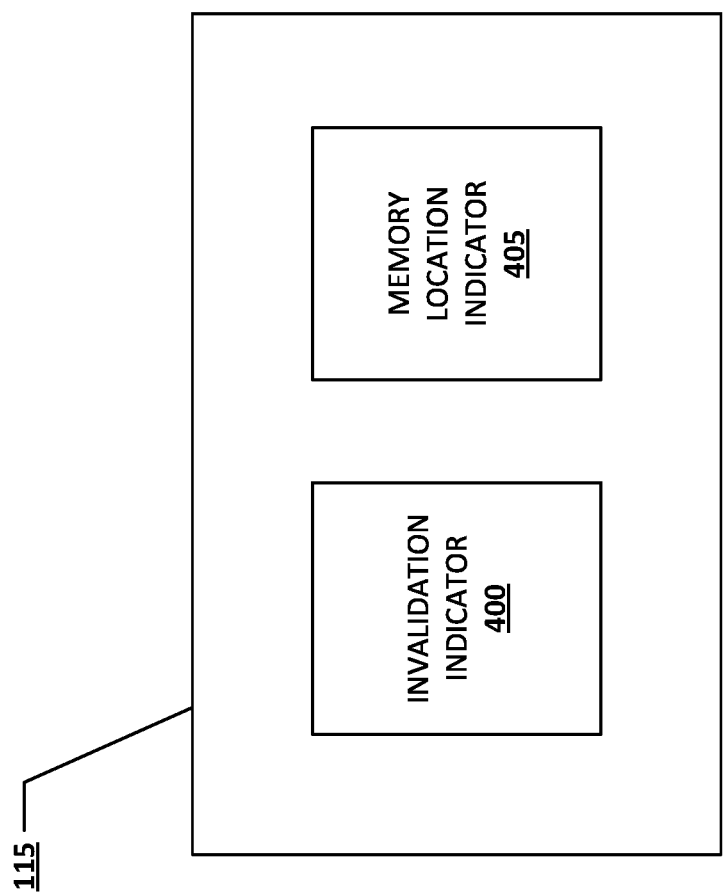
Figure 5:
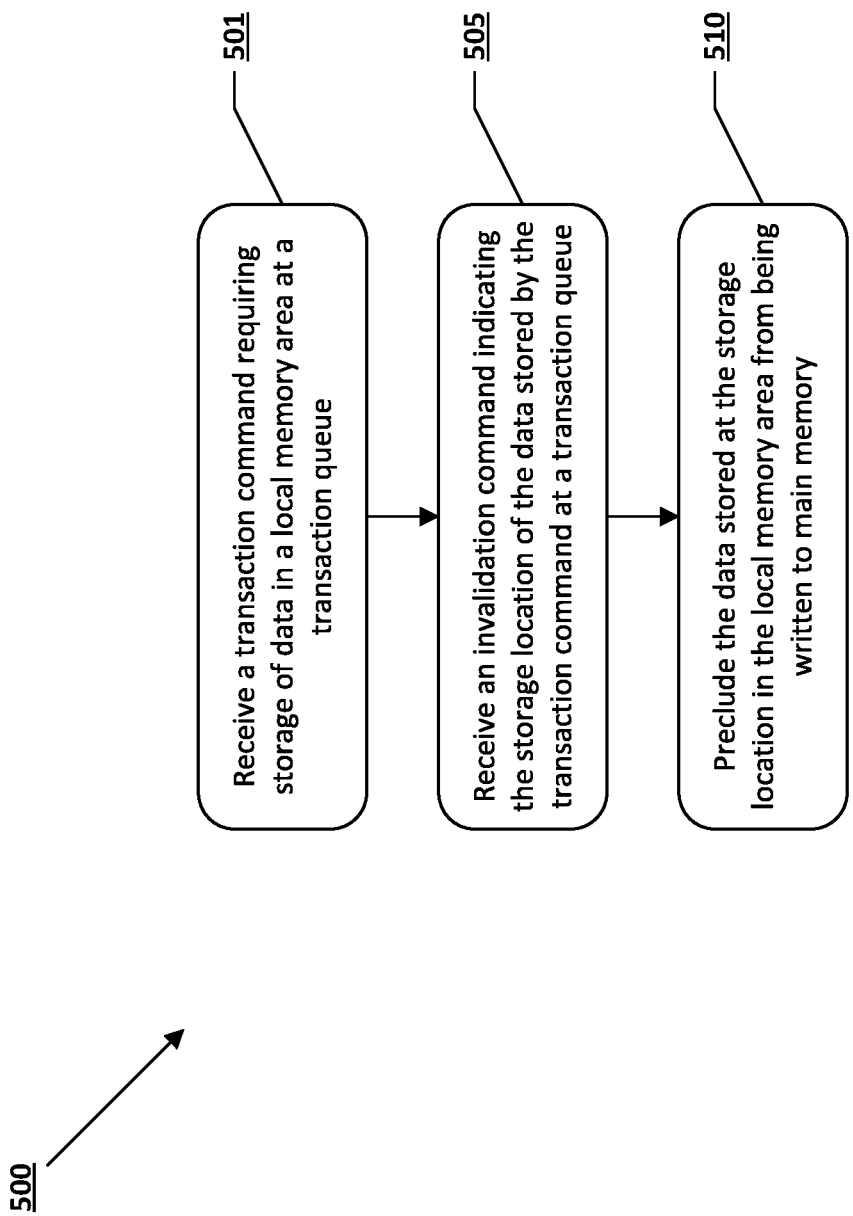
Figure 6:
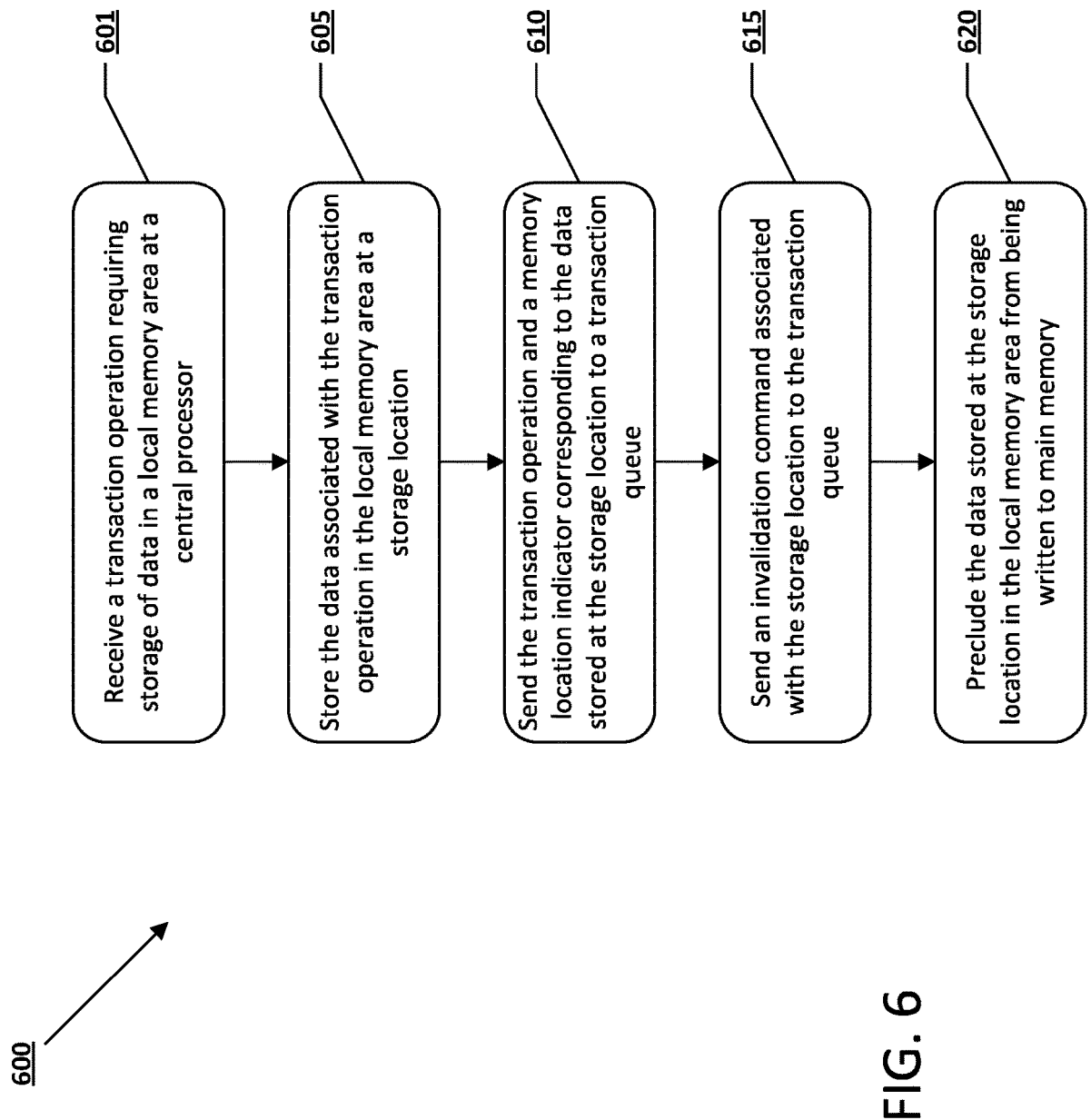

FIG. 1 illustrates a system for receiving system operation commands, processing the system operations, and precluding temporary data from being written to lower level memory, in accordance with one or more embodiments of the present invention;

FIG. 2 illustrates a system for receiving system operation commands from a network by a central processor, processing the system operations, and precluding temporary data from being written to lower level memory, in accordance with one or more embodiments of the present invention;

FIG. 3 illustrates a block diagram of a network transaction command, in accordance with one or more embodiments of the present invention;

FIG. 4 illustrates a block diagram of a cache invalidation command, in accordance with one or more embodiments of the present invention;

FIG. 5 illustrates a flowchart for performing a process of precluding temporary data from being written to lower level memory, in accordance with one or more embodiments of the present invention;

FIG. 6 illustrates a flowchart for performing a process of receiving transaction operations at a central processor and precluding temporary data from being written to lower level memory (e.g., main memory), in accordance with one or more embodiments of the present invention; and FIG. 7 illustrates a flowchart for performing a process of receiving transaction operations and precluding temporary data associated with the network transactions from being written to lower level memory (e g main memory), when the storage location of the temporary data is identified by a virtual address, in accordance with one or more embodiments of the present invention.

DETAILED DESCRIPTION

Various embodiments of the present disclosure will now be described more fully hereinafter with reference to the accompanying drawings in which some but not all embodiments are shown. Indeed, the present disclosure may be embodied in many different forms and should not be construed as limited to the embodiments set forth herein; rather these embodiments are provided so that this disclosure will satisfy applicable legal requirements Like reference numerals refer to like elements throughout.

Systems and methods are provided according to the example embodiments of the present disclosure to preclude temporary data held in cache memory from being written to main memory once the temporary storage space is no longer being utilized. In general, computing systems employ a write policy to copy all data written to cache memory to the associated location in main memory, by default. In many systems, the communication bus required to transfer data between the cache memory and lower level cache or main memory can become overburdened with traffic, leading to overall delays in the computing system. In many systems, an operation may be received that requires temporary storage of data until the command completes processing. This is especially common in systems dealing with network traffic. It is advantageous for these systems to hold the required data in the highest level of cache so the operation can access the data quickly while processing. Usually, it is unnecessary for the data to be written to the lower levels of cache, or to the main memory, even upon completion of the operation. Thus, the default functionality of writing the data to lower level memory creates unnecessary traffic on the memory bus and can be prohibitive to improvements in system performance. As such, it is desirable to provide a mechanism to preclude temporary data from being written to lower levels of memory so as to alleviate unnecessary traffic on the computer system's memory bus.

There are a number of deficiencies and problems associated with present methods and systems for improving cache performance. For example, current solutions utilize complex cache eviction policies that deploy algorithms to determine which data in cache memory should be evicted from the cache and written to lower level memory. While these algorithms may improve cache hit rates, they do not prevent data written to the cache from unnecessarily being written to lower level memory. As such, these solutions fail to significantly reduce the unnecessary traffic utilizing the systems' memory bus bandwidth. Accordingly, Applicant has developed methods and systems in which a cache invalidation command may be processed as part of a sequence of network transactions. The cache invalidation command identifies the correct locations in cache memory to be invalidated, preventing the data from being copied to lower levels of the memory hierarchy system.

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein as receiving data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein as sending data to another computing device, it will be appreciated that the data may be sent directly to another computing device or may be sent indirectly via one or more intermediary computing devices, such as, for example, one or more servers, relays, routers, network access points, base stations, hosts, and/or the like.

Embodiments of the present disclosure are described below with reference to block diagrams and flowchart illustrations. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

The terms "illustrative," "exemplary," and "example" as may be used herein are not provided to convey any qualitative assessment, but instead merely to convey an illustration of an example. Thus, use of any such terms should not be taken to limit the spirit and scope of embodiments of the present invention. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment).

FIG. 1 illustrates a transaction processing system 100 as an exemplary system for receiving system/network operation commands, processing system/network operation commands, and precluding temporary data from being written to lower level memory in a memory hierarchy system 106. In some embodiments, the transaction processing system 100 may receive and process network transactions. While, in other embodiments, the transaction processing system 100 may receive and process system commands, network commands, and/or the like. It will be appreciated that the transaction processing system 100 is provided as an example of an embodiment(s) and should not be construed to narrow the scope or spirit of the disclosure in any way.

As illustrated in FIG. 1, a transaction processing system 100 may comprise a transaction processing module 105, and a memory hierarchy system 106 comprising at least one local memory area 140 communicatively connected to a main memory 150 by a main memory bus 142. The transaction processing system 100 may be configured to receive input commands 135 from a network host, central processor 200, or other module capable of sending and requesting system and/or network transactions. The transaction processing module 105 may be embodied in an entirely hardware embodiment, an entirely computer program product embodiment, an entirely firmware embodiment (e.g., application-specific integrated circuit (ASIC), field-programmable gate array (FPGA), etc.), and/or an embodiment that comprises a combination of computer program products, hardware, and firmware. The transaction processing module 105 and memory hierarchy system 106 may be embodied on a single computing device, such as a data processing unit, or distributed across a plurality of computing devices collectively configured to function as a transaction processing system 100. In some embodiments, the functionality of the transaction processing module 105 may be implemented as part of the network interface card (NIC).

As further illustrated in FIG. 1, embodiments of the transaction processing module 105 may comprise one or more transaction queues 110, a command processor 125, and an address translator 130. The transaction processing module 105 may receive input commands 135 into a transaction queue 110. The transaction queue 110 may be configured to receive transaction commands 120 and invalidation commands 115. Transaction commands 120 may comprise, for example, system transactions/operations, network put/post commands, network read/write commands, network atomic commands, direct memory access (DMA) commands, remote direct memory access (RDMA) read/write commands, compression, encryption, and similar commands. In some embodiments, the transaction queue 110 may be dedicated exclusively to the receipt and processing of network transactions and related commands. In such embodiments, transaction commands 120 may be standard network operations, or network operations configured to comply with the formatting standard of the transaction processing module 105. The command processor 125 may monitor the one or more transaction queues 110 and may read and process input commands 135 from the transaction queue 110 as determined by a scheduling policy. The command processor 125 may copy data to designated input and output buffer locations, initiate the sending and receipt of network data, notify completion of network transactions, and perform other operations necessary to complete the input commands 135. The command processor 125 may have access to a memory hierarchy system 106 for storage of data required to complete input commands 135. The command processor 125 may also be configured to invalidate lines in the local memory area 140 or otherwise prevent the transaction processing system 100 from writing temporary data associated with the transaction command 120 to the main memory 150.

As part of the interface with the memory hierarchy system 106, the command processor 125 may utilize an address translator 130 to determine a physical memory location from a virtual memory address. The address translator 130 may be capable of receiving a virtual memory address and determining the physical memory address using a look up table (LUT) or other similar system resource designed to aid in the translation of virtual memory addresses to physical addresses. The address translator 130 may be capable of receiving a virtual memory address or other memory identifier that provides a mechanism for determining the physical location of data in the computer system's memory hierarchy system 106. Both the invalidation command 115 and the transaction command 120 may include a memory location indicator 305. By using an address translator 130 to determine the physical memory address identified by a memory location indicator 305 in both the transaction command 120 and the invalidation command 115 or by automatically associating the memory location indicator 305 of the transaction command 120 with the invalidation command 115, the transaction processing system 100 may ensure invalidated data is data associated with the corresponding transaction command 120. In some embodiments, the address translator 130 may be implemented as part of the transaction processing module 105. In other embodiments, the address translator 130 may be implemented as part of a memory management system external to a transaction processing module 105.

As further illustrated in FIG. 1, the transaction processing system 100 may further comprise a memory hierarchy system 106. As noted above, the memory hierarchy system 106 may comprise at least one local memory area 140 and at least one main memory 150. In some embodiments, the memory hierarchy system 106 further comprises additional cache memory 145. In some embodiments, the local memory area 140 may comprise cache memory. In other embodiments, the local memory area 140 may include multiple levels of cache memory. The local memory area 140 may consist of a smaller and faster memory type to provide fast access of stored data. The local memory area 140, for example, may comprise volatile or non-volatile static random access memory (SRAM), or another memory product that provides for rapid access of data. In contrast, in some embodiments, the main memory 150 may be a memory storage system located further away from the command processor 125 and may be capable of storing larger amounts of data than the local memory area 140. The main memory 150, for example, may comprise a dynamic random-access memory (DRAM) product.

In some embodiments, the main memory 150 may be communicatively connected to the local memory area 140 by way of a main memory bus 142. The main memory bus 142 may be configured to allow the main memory 150 to transmit data to and receive data from a local memory area 140. The main memory bus 142, in some embodiments, may be the same communication connection used to send input commands 135 to the transaction processing module 105. Still, in other embodiments, the memory hierarchy system 106 may comprise one or more blocks of additional cache memory 145 providing additional storage capacity. The additional cache memory 145 may be communicatively connected to the local memory area 140 by a lower level memory bus 146. These blocks of additional cache memory 145 may also be communicatively connected to main memory 150 through a lower level bus to main memory 148. The lower level memory bus 146 and the lower level bus to main memory 148 may be in addition to or in place of the main memory bus 142 connecting the local memory area 140 to the main memory 150.

As further illustrated in FIG. 1, the transaction command 120 may require temporary storage of data in the memory hierarchy system 106. The transaction command 120, for example, may be a remote direct memory access (RDMA) read or write. In an RDMA read, for example, to improve efficiency, the transaction processing system 100 may provide readily accessible space for data to be temporarily held as it is read from a requested memory location. Local memory area 140 provides a readily accessible location to hold data associated with the transaction command 120 as the transaction command 120 is processed. The associated data will remain in local memory area 140 until an RDMA read command has been completed and the data has been sent to a requestor at the appropriate network location. As another example, in an RDMA write, to improve efficiency, the transaction processing system 100 may provide readily accessible space for data to be temporarily held as it is written to a specified memory location. Local memory area 140 once again provides a readily accessible location to hold data associated with the transaction command 120 as the transaction command 120 is processed. The associated data will remain in local memory area 140 until an RDMA write command has been completed and the data has been written to the appropriate network location. In either case, once the transaction command 120 has been completed, the data stored in the local memory area 140 is no longer needed, and writing the data to main memory 150 is unnecessary.

Also illustrated in FIG. 1, a invalidation command 115 may be placed in the transaction queue 110 corresponding to the transaction command 120 associated with data stored in the local memory area 140. The invalidation command instructs the transaction processing system 100 to invalidate the temporary data stored in the local memory area 140 by the transaction command 120, thus precluding the data from being copied to the main memory 150. The invalidation command 115 may contain the memory location indicator 405 used to identify the corresponding transaction command 120 and/or the memory location containing data associated with the corresponding transaction command 120. The command processor 125, as instructed by the invalidation command 115, may preclude the data identified by the memory location indicator 305/405 from being written to main memory 150. The command processor 125 may preclude the data from being written to main memory 150 by invalidating the data at the memory locations identified by the memory location indicator 305/405, asserting flags on the cache lines associated with the data identified by the memory location indicator 305/405, invalidating cache lines associated with the physical addresses of the data, or by other similar means intended to preclude the data from being copied from local memory area 140 to additional cache memory 145 or main memory 150. By precluding data associated with the transaction command 120 from being written to main memory 150, the transaction processing system 100 prevents additional traffic associated with a write to main memory 150 from occupying bandwidth on the main memory bus 142.

FIG. 2 illustrates another embodiment of a transaction processing system 250 that comprises a central processor 200 for receiving external transaction messages 201. The central processor 200 of FIG. 2 may be embodied in an entirely hardware embodiment, an entirely computer program product embodiment, an entirely firmware embodiment (e.g., application-specific integrated circuit, field-programmable gate array, etc.), and/or an embodiment that comprises a combination of computer program products, hardware, and firmware. In addition, the central processor 200, the transaction processing module 105, and the memory hierarchy system 106 may be embodied on a single computing device, such as a network interface card or data processing unit, or distributed across a plurality of computing devices collectively configured to function as the transaction processing system 250.

As illustrated in FIG. 2, the central processor 200 in some embodiments of the transaction processing system 250 may be communicatively connected to a network source 205, in addition to the transaction queue 110 of the transaction processing module 105, and the memory hierarchy system 106. In such embodiments, the central processor 200 may receive external transaction messages 201 from the network source 205. External transaction messages 201 may comprise, for example, system transactions/operations, network put/post commands, network read/write commands, network atomic commands, direct memory access (DMA) operations, remote direct memory access (RDMA) read/write commands, compression operations, encryption operations, and similar messages. The central processor 200 may be configured to receive the external transaction messages 201 and write the messages as input commands 135, such as a transaction command 120, to a transaction queue 110, using a processor to processing module bus 206. In some embodiments, a central processor 200 may be configured to provide external transaction messages 201 in a form recognizable by a transaction processing module 105 and capable of input into a transaction queue 110, while in other embodiments, a central processor 200 may be configured to relay the external transaction messages 201 directly to the transaction queue 110 in standard form.

In some embodiments, the central processor 200 may generate a invalidation command 115 to be placed in the transaction queue 110 in coordination with the transaction command 120. In other embodiments, a invalidation command 115 may be generated by the transaction processing module 105 and automatically added to the transaction queue 110. Still, in other embodiments, the transaction processing module 105 may provide a notification to the central processor 200 indicating a transaction command 120 is complete. In response to receipt of the complete command, the central processor 200 may generate and send a invalidation command 115 to a transaction queue 110.

As further illustrated in FIG. 2, in some embodiments, the central processor 200 may interface directly with the memory hierarchy system 106 through a processor to memory bus 210. In some embodiments, a processor to memory bus 210 may be the same bus as the processor to processing module bus 206. In some embodiments, a processor to memory bus 210 may allow the central processor 200 to request space, store data, and/or otherwise access storage locations in the memory hierarchy system 106.

With reference to FIG. 3, a block diagram illustrating the transaction command 120 is provided in accordance with some embodiments. In some embodiments, a transaction command 120 may comprise a transaction operation 300 and a memory location indicator 305.

In some embodiments, the transaction operation 300 may be system operation, or a standard network command in compliance with RDMA, Ethernet, InfiniBand, Internet Protocol (IP), hypertext transfer protocol (HTTP), or other established network protocol. Still, in other embodiments, the transaction operation 300 may be a system operation or network command modified to comply with the transaction processing module 105 and an associated transaction queue's 110 implementation. According to such embodiments, the transaction operation 300 will contain necessary information to execute the raw network command used to generate the transaction command 120.

As illustrated in FIG. 3 and FIG. 4, both the invalidation command 115 and the transaction command 120 may include a memory location indicator 305, 405. The memory location indicator 305, 405 may contain a physical memory address, a virtual memory address, a memory key, or another indicator capable of identifying the physical memory location of the data associated with the transaction command 120. In some embodiments, for example, the memory location indicator 305, 405 may be a memory key that is a virtual address, capable of translation into a physical memory location. In some embodiments, the invalidation command 115 memory location indicator 405 and the transaction command 120 memory location indicator 305 may be identical and both may be independently capable of identifying the physical memory location of data associated with the transaction command 120. Still, in other embodiments, the transaction command 120 memory location indicator 305 may have the memory key associated with the physical addresses of the transaction command 120 data, while the invalidation command 115 memory location indicator 405 may identify the corresponding transaction command 120, indicating the physical addresses associated with the corresponding transaction command 120 should be invalidated. In other embodiments, the memory location indicator 305, 405 of the invalidation command 115 and/or the transaction command 120 may be implicit in the order of the input commands 135. For example, the transaction processing system 100 may determine the memory location indicator 405 of the invalidation command 115 by virtue of the position of the invalidation command 115 in proximity to the transaction command 120 in the transaction queue 110. In some embodiments, the invalidation command 115 may immediately succeed the transaction command 120. In such an embodiment, the transaction processing system 100 may automatically associate the invalidation command 115 memory location indicator 405 with the memory location indicator 305 of the immediately preceding transaction command 120. The transaction processing module 105 may then use the transaction command 120 memory location indicator 305 of the preceding transaction command 120 to identify physical addresses to be invalidated when the invalidation command 115 is received.

With reference to FIG. 4, a block diagram of a invalidation command 115 is provided in accordance with some embodiments. In some embodiments, the invalidation command 115 may comprise an invalidation indicator 400 and the memory location indicator 405.

The invalidation indicator 400 may be any flag, heading, title, name, character sequence, other similar structure, intended to indicate to the command processor 125 that data associated with the memory location indicator 305 is to be precluded from being written to main memory 150 or additional cache memory 145. In some embodiments, the invalidation indicator 400 may be implied by the invalidation command's 115 proximity to the transaction command 120. For example, the command processor 125 may be configured to recognize a command immediately succeeding a transaction command 120 requiring storage of data in local memory area 140 as the invalidation command 115. In an example implementation, the transaction processing module 105 may preclude data from being written to the main memory 150 by writing a value to invalidate cache lines or otherwise indicating cache values stored at locations associated with the memory location indicator 305 are invalidated, indicating to a memory manager not to write the temporary data to main memory 150. In other implementations, data may be precluded from being written to the main memory 150 by the central processor 200, an external host, or any other module communicatively connected to the memory hierarchy system 106 and capable of issuing commands to preclude writes of data stored in local memory area 140 to main memory 150.

As described previously, the memory location indicator 405 may be used to determine the physical addresses of the data of the corresponding transaction command 120 to be invalidated.

Referring now to FIG. 5, a flowchart is provided illustrating an example process 500 for precluding temporary data associated with a transaction command 120 from being written to lower levels of a memory hierarchy system 106. As shown in block 501, in some embodiments, a transaction queue 110 receives a transaction command 120 requiring storage of data in a local memory area 140 to enable a transaction processing module 105 quick access to associated data while the transaction operation 300 is being executed. In some implementations, the transaction processing module 105 may comprise more than one transaction queue 110 configured to receive input commands 135.

At block 505, the transaction queue 110 receives the invalidation command 115 indicating a storage location of data stored by the associated transaction command 120. In some example implementations, the invalidation command 115 may contain a memory location indicator 305 associated with a physical memory address. In other example implementations, the memory location indicator 305 may be associated with a virtual memory address that must be translated by an address translator 130. Still, in other example implementations, the memory location indicator 305 in the invalidation command 115 may be implied based on the proximity of the invalidation command 115 to the transaction command 120 in the transaction queue 110, as described above.

In some embodiments, the memory hierarchy system 106 may be formed of more than one layer of lower level memory in addition to the main memory 150. For example, the transaction processing system 100 may include a local memory area 140 that is a first level cache and additional cache memory 145 that includes a second level cache, and in some embodiments, a plurality of cache levels. In such embodiments, the transaction processing system 100 may invalidate memory locations associated with the memory location indicator 305, at each level of cache, including the local memory area 140 and the plurality of cache levels in the additional cache memory 145. Invalidating memory locations at each level of cache indicates to the transaction processing system 100 to preclude the associated data from being written to main memory 150.

At block 510 the transaction processing system 100 precludes data identified by the memory location indicator 305 from being written to lower level memory in the memory hierarchy system 106.

Referring now to FIG. 6, a flowchart is provided illustrating an example process 600 for precluding temporary data associated with a transaction operation 300 from being written to lower levels of a memory hierarchy system 106 when external transaction messages 201 are received by a central processor 200.

At block 601, the central processor 200 receives an external transaction message 201 requiring storage of data in a local memory area 140. At block 605, the central processor 200 stores data associated with an external transaction message 201 in a local memory area 140. By storing data associated with an external transaction message 201 in a local memory area 140, a transaction processing system 100 may quickly access associated data while an external transaction message 201 is being executed. In some embodiments, storing data associated with an external transaction message 201 may be executed by a central processor 200. In other embodiments, data storage may be executed by a transaction processing module 105. Still, in other embodiments, data storage may be executed by an external host or memory management system.

At block 610, the command processor 125 sends a transaction command 120, comprising a transaction operation 300 and a memory location indicator 305 corresponding to the data stored at a storage location, to a transaction queue 110.

At block 615 the command processor 125 sends a invalidation command 115 comprising a memory location indicator 405 and an invalidation indicator 400 to a transaction queue 110 of a transaction processing module 105. The invalidation indicator 400 may be configured as described above with respect to FIG. 4. The memory location indicator 405 may be configured as described above with respect to FIGS. 3-4.

At block 620 the transaction processing system 100/200 precludes the data associated with the external transaction message 201, and identified by the memory location indicator 305/405, from being written to main memory 150. Precluding the data from being written to main memory 150 prevents unnecessary traffic on the main memory bus 142.

Referring now to FIG. 7, a flowchart is provided illustrating an example process 700 for precluding temporary data associated with a transaction command 120 from being written to lower levels of a memory hierarchy system 106 when physical addresses are identified by a virtual address.

At block 701, the transaction command 120 requiring storage of data in a local memory area 140 is received at a transaction queue 110.

At block 705, memory space is allocated in the local memory area 140 at a storage location identified by a virtual address, and data associated with the transaction command 120 is stored at a storage location. In some embodiments, a virtual address is used to identify a location in the memory hierarchy system 106 to enable a process to operate as if it has access to a larger portion of available memory. In these embodiments, the virtual address does not directly map to a physical location in memory but must be translated by a computer system's memory management unit or similar unit.

At block 710, the invalidation command 115 containing the memory location indicator 305 indicating the virtual address of data associated with a transaction command 120 is received at a transaction queue 110.

At block 715, the transaction processing module 105 determines a storage location of data associated with the transaction command 120 by translating the memory location indicator 305 using an address translator 130.

At block 720, the transaction processing module 105 determines a storage location of data associated with the invalidation command 115 by translating the memory address identified by the memory location indicator 305 using an address translator 130. By using an address translator 130 to translate the memory location indicator 305 associated with both the transaction command 120 and the invalidation command 115, the transaction processing module 105 may ensure that the cache locations corresponding to both commands match.

At block 720, data stored at the physical addresses in the local memory area 140 is precluded from being written to main memory 150 and the lower levels of the memory hierarchy system 106.

Many modifications and other embodiments of the inventions set forth herein will come to mind to one skilled in the art to which these inventions pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method performed in a system comprising a local memory area, the method comprising:
   receiving, by a transaction queue, an invalidation command comprising a memory location indicator, wherein the invalidation command instructs the invalidation of data stored at physical addresses in the local memory area corresponding to the memory location indicator; and
   precluding, by a command processor configured to process transactions in the transaction queue, the data stored at the physical addresses from being written to a main memory in response to the invalidation command,
   wherein the invalidation command further comprises an invalidation indicator defining a structure that indicates to the command processor that the data stored at physical addresses in the local memory area corresponding to the memory location indicator is to be precluded from being written to the main memory and a second cache memory,
   wherein the invalidation indicator is determined based on a proximity between the invalidation command and a transaction command received by the transaction queue.

2. The method of claim 1, further comprising:
   receiving, by a central processor, a transaction operation requiring storage of the data in the local memory area;
   storing, by the central processor, the data associated with the transaction operation in the local memory area at the physical addresses;
   sending, by the central processor, the transaction operation to the transaction queue; and
   sending, by the central processor, the invalidation command to the transaction queue.

3. The method of claim 1, wherein the memory location indicator identifies a virtual address.

4. The method of claim 1, wherein the physical addresses are determined by translating the memory location indicator using an address translator.

5. The method of claim 1, wherein the command processor is:
   integrated into a network interface card; or
   implemented in an application-specific integrated circuit.

6. The method of claim 1, wherein the local memory area is a first cache memory, wherein the method further comprises:
   precluding the data stored at the physical addresses from being written to the second cache memory, wherein the second cache memory is a lower level cache memory than the first cache memory.

7. The method of claim 1, wherein the local memory area is a first cache memory, wherein the method further comprises invalidating multiple layers of cache.

8. The method of claim 1, wherein the transaction queue is configured to receive network transaction operations requiring storage of data in the local memory area.

9. The method of claim 1, wherein the local memory area comprises a cache memory and the data stored at the physical addresses is precluded from being written to the main memory by invalidating cache lines associated with physical addresses.

10. The method of claim 1, wherein the local memory area is a first cache memory, and the invalidation command instructs the invalidation of all levels of cache memory.

11. The method of claim 1, wherein the invalidation indicator is determined based on identifying that the invalidation command immediately succeeds the transaction command.

12. A system comprising:
   a local memory area configured to store data;
   a transaction queue configured to receive an invalidation command, wherein the invalidation command instructs the invalidation of data stored at physical addresses in the local memory area corresponding to the memory location identifier; and
   a command processor configured to process transactions in the transaction queue, wherein the command processor is further configured to:
   preclude the data stored at the physical addresses from being written to the main memory in response to the invalidation command,
   wherein the invalidation command further comprises an invalidation indicator defining a structure that indicates to the command processor that the data stored at physical addresses in the local memory area corresponding to the memory location indicator is to be precluded from being written to the main memory and a second cache memory, wherein the invalidation indicator is determined based on a proximity between the invalidation command and a transaction command received by the transaction queue.

13. The system of claim 12, further comprising a central processor configured to:
   receive a transaction operation requiring storage of the data in the local memory area;
   store the data associated with the transaction operation in the local memory area at the physical addresses;
   send the transaction operation to the transaction queue; and
   send the invalidation command to the transaction queue.

14. The system of claim 12, wherein the memory location indicator identifies a virtual address.

15. The system of claim 12, further comprising an address translator configured to determine the physical addresses by translating the memory location indicator.

16. The system of claim 12, further comprising a command processor configured to process transactions in the transaction queue and further configured to preclude the data stored at the physical addresses from being written to the main memory in response to an invalidation command.

17. The system of claim 12, wherein the command processor is:
   integrated into a network interface card; or
   implemented in an application-specific integrated circuit.

18. The system of claim 12, wherein the local memory area is a first cache memory, and the system further comprises at least one additional cache memory, wherein the invalidation command instructs the invalidation of all levels of cache memory.

19. The system of claim 12, wherein the local memory area comprises a cache memory and the data stored at the physical addresses is precluded from being written to the main memory by invalidated cache lines associated with the physical addresses.

20. The system of claim 12, wherein the local memory area is a first cache memory, wherein the invalidation command instructs the invalidation of multiple layers of cache memory.

\* \* \* \* \*